United States Patent Office 3,419,585
Patented Dec. 31, 1968

3,419,585
4'-METHYLSULFONYL-3-PHENYL-
SALICYLANILIDES
Jack D. Early, Bethesda, Md., and John P. Chupp, Kirkwood, Mo., assignors to Monsanto Company, St. Louis, Mo., a corporation of Delaware
No Drawing. Original application Oct. 13, 1965, Ser. No. 495,668. Divided and this application Oct. 3, 1966, Ser. No. 583,966
4 Claims. (Cl. 260—397.6)

ABSTRACT OF THE DISCLOSURE

4'-methylsulphonyl-3-phenylsalicylanilides are useful in destroying gastrapods, the class of animal life Gastropoda of the phylum Mollusca.

This application is a division of our U.S. application Ser. No. 495,668, filed Oct. 13, 1965, now U.S. Pat. No. 3,305,440.

This invention relates to new and useful 4'-methylsulfonyl-3-phenylsalicylanilides of the structural formula

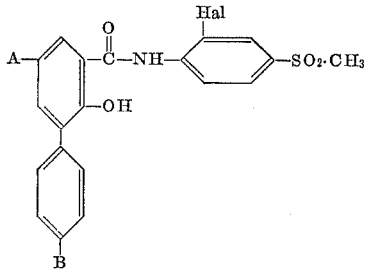

wherein A is halogen of atomic weight in the range of 35 to 80 (i.e. chloro or bromo, but preferably chloro); wherein B is hydrogen or halogen of atomic weight in the range of 35 to 80 (i.e. chloro or bromo, preferably chloro); and wherein Hal means halogen of atomic weight in the range of 18 to 80 (i.e. fluoro, chloro or bromo, but preferably chloro).

The compounds of this invention are prepared by reacting substantially one mole of a 3-phenylsalicylic acid of the structural formula

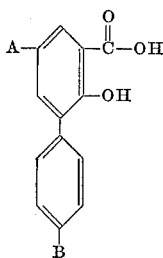

wherein A and B have the aforedescribed significance with substantially one mole of a 4'-methylsulfonylaniline of the formula

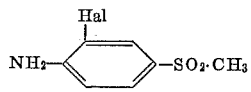

wherein Hal has the aforedescribed significance in the presence of about 0.10 to about 1 mole of phosphorus trichloride at a temperature in the range of about 60° C. to about 200° C. and in the presence of an inert aromatic organo-liquid, as for example benzene, toluene, xylene, chlorobenzene, dichlorobenzene, trichlorobenzene, and the like, and mixtures thereof.

As illustrative of the preparation of the compounds of this invention and certain analogues thereof is the following:

EXAMPLE I

To a suitable reaction vessel equipped with a thermometer, agitator and reflux condenser is charged 4.9 parts by weight of 5-chloro-3-phenylsalicylic acid and 111 parts by weight of chlorobenzene. The so charged mass is heated to about 85° C. and thereto is added 3.9 parts by weight of 2-chloro-4-methylsulfonylaniline followed by 2.5 parts by weight of phosphorus trichloride in 22 parts by weight of chlorobenzene. The reaction mass is then heated to the reflux temperature (about 135° C.) and then refluxed for five hours. The reaction mass is then cooled to about 70° C. whereupon and with agitation is added 50 parts by weight of water and 50 parts by weight of 20% hydrochloric acid. The mass is then permitted to stand for about 15 minutes and the organic layer separated, washed with water, and then stripped of volatiles under vacuum. The residue upon recrystallization from benzene gave 4'-methylsulfonyl-2',5-dichloro-3-phenylsalicylanilide, M.P. 208–209° C.

EXAMPLE II

Employing the procedure of Example I but replacing 5-chloro-3-phenylsalicylic acid with an equimolecular amount of 5-chloro-3-(4-chlorophenyl)salicylic acid there is obtained 4'-methylsulfonyl-2',5-dichloro-3-(4-chlorophenyl)salicylanilide, M.P. 241–244° C.

EXAMPLE III

Employing the procedure of Example I but replacing 5-chloro-3-phenylsalicylic acid with an equimolecular amount of 5-bromo-3-phenylsalicylic acid there is obtained 4'-methylsulfonyl-2'-chloro-5-bromo-3-phenylsalicylanilide, M.P. 220° C.

EXAMPLE IV

Employing the procedure of Example I but replacing 2-chloro-4-methylsulfonylaniline with an equimolecular amount of 2-fluoro-4-methylsulfonylaniline there is obtained 4'-methylsulfonyl-2'-fluoro-5-chloro-3-phenylsalicylanilide, a solid.

EXAMPLE V

Employing the procedure of Example I but replacing 2-chloro-4-methylsulfonylaniline with an equimolecular amount of 2-bromo-4-methylsulfonylaniline there is obtained 4'-methylsulfonyl-2'-bromo-5-chloro-3-phenylsalicylanilide, a solid.

EXAMPLE VI

Employing the procedure of Example I but replacing 5-chloro-3-phenylsalicylic acid and 2-chloro-4-methylsulfonylaniline, respectively, with equimolecular amounts of 5-chloro-3-(4-chlorophenyl)salicylic acid and 2-fluoro-4-methylsulfonylaniline there is obtained 4'-methysulfonyl-2'-fluoro-5-chloro-3-(4 - chlorophenyl)salicylanilide, a solid.

Similarly the analogue 4'-methylthio-5-chloro-3-(4-chlorophenyl)salicylanilide, M.P. 164–165° C., is prepared from 5-chloro-3-(4-chlorophenyl)salicylic acid and 4-methylthioaniline, and the analogue 2',4',5-trichloro-3-(4-chlorophenyl)salicylanilide, M.P. 240–242° C., is prepared from 5-chloro-3-(4-chlorophenyl)salicylic acid and 2,4-dichloroaniline, and the analogue 4'-methylsulfonyl-5-chloro-3-(4-chlorophenyl) salicylanilide, M.P. 272–277° C. with decomposition, is prepared from 4-methylsulfonylaniline and 5-chloro-3-(4-chlorophenyl) salicylic acid, and the analogue 2'-nitro-4'-trifluoromethyl-5-chloro-3-(4-chlorophenyl)salicylanilide, M.P. 178–179° C., is prepared from 5-chloro-3-(4-chlorophenyl)salicylic acid and 2-nitro-4-trifluoromethylaniline.

The compounds of this invention are particularly useful in destroying gastropods, that is the class of animal life Gastropoda within the phylum Mollusca, which cause considerable agricultural and horticultural damage, and particularly the snails of this class of animal life which are the necessary intermediate host or vector in the life cycle of various common parasites, as for example the trematodes or flukes which are parasitic in man and animals causing schistomiasis and like diseases.

As illustrative of the gastropodicidal properties of the compounds of this invention as compared to analogues thereof is the following:

Three snails (*Planobarius corneus* which is the species of snail host of the cyclocoelid *Tracheophilus sisowi*, the blood fluke *Bilharziella polonica* and several other trematodes) of 6 to 8 weeks of age are placed in a 200 x 32 mm. glass tube (three replicates) and thereto is added the compound to be evaluated in the form of an aqueous dispersion thereof having a concentration of 1.0 part per million, that is p.p.m., thereof. (This dispersion is prepared by dissolving and/or dispersing sufficient of the particular compound in 10 ml. of acetone to make a one percent by weight solution or mixture thereof and then adding sufficient water to give dispersions of the following tabulated concentration.) The percent kill (that is the average of three replicates) at the end of 24 hours exposure at room temperature for each of the following itemized compounds at the itemized concentration was found to be as follows:

| Compound: | Percent kill at a conc. of 1.0 p.p.m. |
|---|---|
| 4'-methylthio-5-chloro-3-(4 - chlorophenyl)-salicylanilide | 0 |
| 4'-methylsulfonyl-2',5-dichloro - 3 - phenylsalicylanilide | 100 |
| 4'-methylsulfonyl - 2',5 - dichloro-3-(4-chlorophenyl)salicylanilide | 100 |
| 4' - methylsulfonyl - 5 - chloro-3-(4 - chlorophenyl)salicylanilide | 0 |
| 4'-methylsulfonyl - 2',5-dichlorosalicylanilide * | 0 |
| 2',4',5-trichloro - 3 - (4-chlorophenyl)-salicylanilide | 0 |
| 2'-nitro - 4' - trifluoromethyl - 5 - chloro-3-(4-chlorophenyl)salicylanilide | 0 |

*M.P. 215–217° C., prepared from 2-chloro-4-methylsulfonylaniline and 5-chlorosalicylic acid in the presence of phosphorus trichloride similarly to the process of Example I.

In combatting the aquatic Gastropoda it is necessary to apply the gastropodicide to the waters or land areas adjacent thereto which form their habitats, and therefore to be practical the compounds of this invention must exhibit gastropodicidal activity at relatively high dilutions.

In combatting the amphibious Gastropoda the compounds of this invention can be employed per se or formulated into a dust and dispersed or scattered on vegetation or on the ground along banks of streams, rivers, irrigation canals, or the edges of other bodies of water so that the amphibious Gastropoda will come in contact with the gastropodicidal agent when it leaves the water and begins to travel across ground areas.

Where the Gastropoda sought to be combatted has a water habitat the compounds of this invention can be added per se to the water, or in the form of a formulated dust cast on the surface of the water, or sprayed on the water in the form of a solution thereof or a liquid emulsion formulation thereof.

Inert diluent powders for the formulation of such dusts include fuller's earth, diatomaceous earth, bentonite, talc, pyrophillite, soybean flour, wood flour, and walnut shell flour, which dust preferably have a particle size of 5 microns or below and contain from 10 to 75 percent by weight of a compound of this invention. Ordinarily such dusts will be applied at the rate of about 25 to 50 pounds per acre of surface area. These dusts can also contain from 1 to 5 percent by weight of a non-ionic surfactant to provide a "wettable" dust formulation. Liquid formulations can be prepared by dissolving the compounds of this invention in a suitable organic solvent such as acetone and sprayed as such or in admixture with a non-ionic emulsifier to form a liquid emulsion formulation for spray purposes. The actual effective concentration of the compound of this invention for gastropodicidal purposes will depend upon the particular Gastropoda, weather conditions, and whether it is to be applied directly to the water which forms the habitat for the Gastropoda or to land areas which are crossed by amphibious Gastropoda either as the compound per se or in the form of formulations thereof. Those skilled in this art can readily determine the proper concentration for any particular application by knowing the particular dilution factor, which is generally expressed as the maximum aqueous dilution which will produce a 50% kill at a dilution of one part by weight per 8000 parts by weight of water.

While this invention has been described with respect to certain embodiments it is to be understood that it is not so limited and that variations and modifications thereof obvious to those skilled in the art can be made without departing from the spirit or scope of this invention.

What is claimed is:

1. A 4'-methylsulfonyl-3-phenylsalicylanilide of the formula

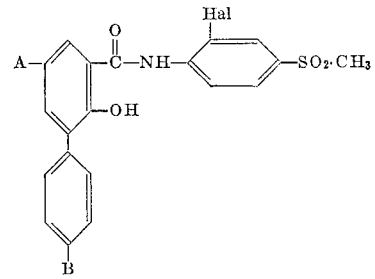

wherein A is halogen of atomic weight in the range of 35 to 80, wherein B is selected from the group consisting of hydrogen and halogen of atomic weight in the range of 35 to 80, and wherein Hal means halogen of atomic weight in the range of 18 to 80.

2. A compound of claim 1 wherein Hal means chloro, wherein A means chloro, and wherein B means hydrogen.

3. A compound of claim 1 wherein Hal means chloro, and wherein A and B respectively mean chloro.

4. A compound of claim 1 wherein Hal means chloro and wherein A and B respectively are halogen of atomic weight in the range of 35 to 80.

References Cited

UNITED STATES PATENTS

| 3,216,896 | 11/1965 | Early | 167—30 |
| 3,231,465 | 1/1966 | Early | 167—30 |
| 3,305,440 | 2/1967 | Chupp et al. | 167—30 |

HENRY R. JILES, *Primary Examiner.*

C. SHURKO, *Assistant Examiner.*

U.S. Cl. X.R.

167—30